Feb. 27, 1951        H. C. LITTLE        2,543,033
OIL BURNING DOWNDRAFT FLOOR FURNACE
Filed June 12, 1944        2 Sheets-Sheet 1
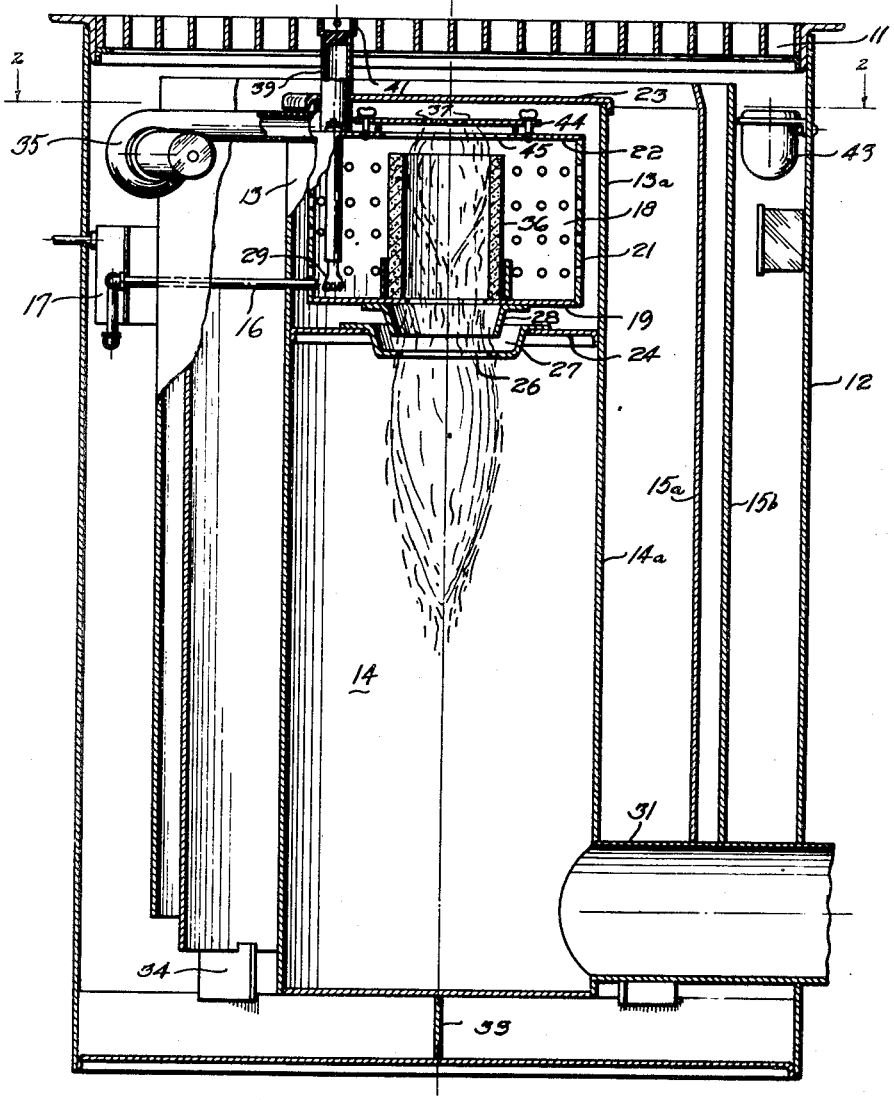
FIG_1_
INVENTOR.
HARRY C. LITTLE
BY
Gardner & Warren
HIS ATTORNEYS Feb. 27, 1951 H. C. LITTLE 2,543,033
OIL BURNING DOWNDRAFT FLOOR FURNACE
Filed June 12, 1944 2 Sheets-Sheet 2
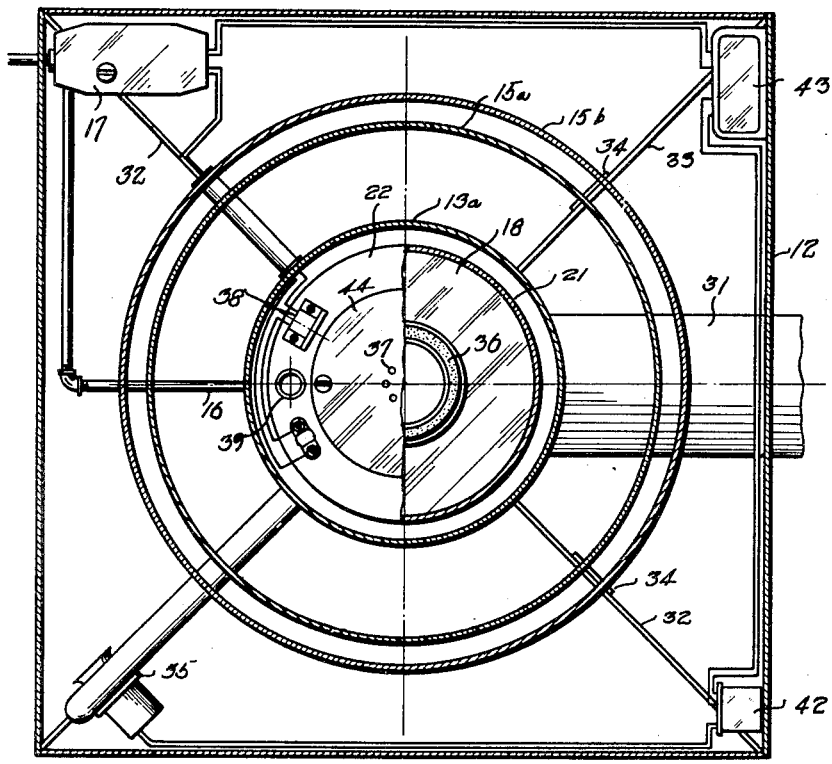
FIG_2_
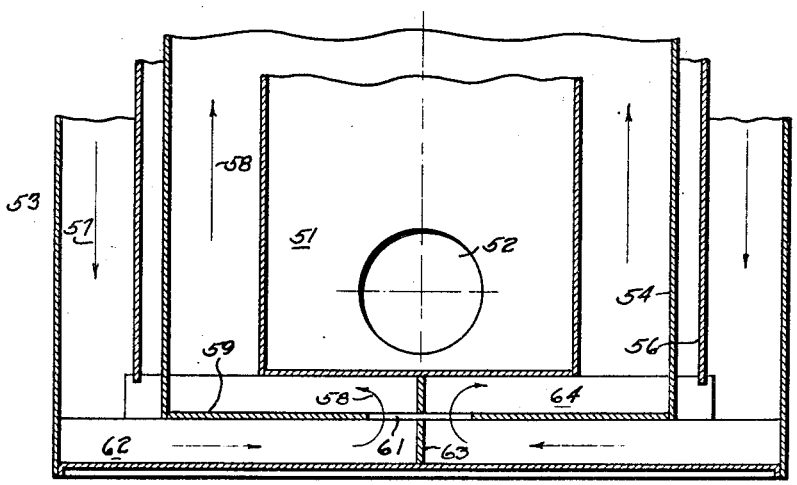
FIG_3_
INVENTOR.
HARRY C. LITTLE
BY Gardner & Warren
HIS ATTORNEYS Patented Feb. 27, 1951

2,543,033

UNITED STATES PATENT OFFICE 2,543,033

OIL BURNING DOWNDRAFT FLOOR FURNACE

Harry C. Little, San Rafael, Calif.

Application June 12, 1944, Serial No. 539,891

7 Claims. (Cl. 126—116)

This invention relates to a furnace and more particularly to a floor furnace having a down draft flame.

Conventional floor furnaces are provided with a grill at floor level, a combustion chamber immediately below the grill and a burner in the bottom of the furnace. This construction and arrangement causes the grill to be heated by the combustion chamber to a temperature much greater than that of the hot air discharged from the furnace, with attendant hazards of fire or of burning anyone who may touch the grill. Further the flame in such furnaces is directed upwardly toward the floor or grill which is not without danger since escape of flame—as when the combustion chamber rusts or burns out from long usage—is likely to be near floor level. The conventional arrangement also has the disadvantage that the burner and burner controls are relatively inaccessible from floor level.

An object of the present invention is to improve heating efficiency in a floor furnace by providing a down draft flame and by causing air to pass upwardly around the combustion chamber counter currently to the flame.

An additional object of the present invention is to provide a floor furnace in which the temperature of the grill is maintained at relatively low levels without the necessity of reducing combustion chamber or hot air temperatures, as compared with furnaces of conventional construction and arrangement.

Another object of the invention is to provide a floor furnace having the burner parts readily accessible from floor level for cleaning or repair and in which burner controls are easily reached and operated from the grill.

The invention possesses other objects and features of advantage, some of which, with the foregoing, will be set forth in the following description of the preferred form of the invention which is illustrated in the drawing accompanying and forming a part of the specification. It is to be understood, however, that variations in the showing made by the said drawing and description may be adopted within the scope of the invention as set forth in the claims.

Referring to the drawings:

Figure 1 is a vertical longitudinal section through a furnace embodying the invention.

Figure 2 is a plan of a transverse horizontal section along line 2—2 of Figure 1 and with parts broken away as indicated to reveal interior burner parts.

Figure 3 is a vertical longitudinal section of a modified form of furnace bottom.

The furnace depicted in the accompanying drawing comprises a grill 11 mounted at the top of furnace casing 12, with a burner 13 and a combustion chamber 14 within the casing. In the usual installation, grill 11 and the open upper end of the furnace casing are mounted at floor level and the surface casing extends downwardly below the floor of a room or building which is to be heated. Circulation of air through the furnace may be effected in any suitable manner. As here shown, air circulation is thermally induced and cold air passes through the outer section of the grill downwardly along furnace casing 12, then upwardly around combustion chamber 14. The heated air is discharged upwardly through grill 11 and preferably through inner sections thereof to avoid interference with the downward flow of cold air into the furnace.

Cross currents between the downwardly flowing cool air and the upwardly flowing hot air streams within the furnace casing are prevented in the preferred form of the invention shown in the drawing, by cylindrical partitions 15a and 15b. It will be noted that these partitions surround the combustion chamber and burner casing and are spaced therefrom as well as from the furnace casing 12 to define an outer cold air passage and an inner hot air conduit.

Burner 13, as here shown, comprises a vaporization chamber or pot formed by container 18, desirably of cylindrical shape defined by bottom wall 19, a cylindrical side wall 21 and top wall 22. Oil is supplied to the bottom wall 19 of the container by oil inlet pipe 16. Any suitable oil control valve, such as oil level responsive control 17 here shown, may be provided in pipe 16. Air inlet means, preferably in the form of a plurality of openings in side wall 21, serves to introduce air into the container for mixing with oil vapor formed therein preparatory to discharge for burning in the combustion chamber.

As will be noted from the drawing, combustion chamber 14 is placed in the lower portion of the furnace casing away from grill 11 and burner 13 is positioned between the grill and said chamber. This construction has the important advantage that the grill is maintained at relatively low temperatures (without reduction in furnace temperature) since the burner acts as a heat transfer barrier or shield to protect the grill from the direct radiant heat of the combustion chamber. The burner also spaces the combustion chamber from the grill which further reduces heat transfer to the grill without reducing furnace efficiency.

The combustion chamber 14, in the form here shown, is defined by a vertically extending tube 14a, preferably cylindrical in shape, and is positioned centrally of the furnace casing 12. As illustrated in the drawing, burner 13 is provided with a casing 13a which comprises an upward extension of the combustion chamber wall 14a. The burner casing is closed at its upper end by top 23 which is friction fit or otherwise removably secured to casing 13a. The burner and combustion chamber are separated by partition 24 which forms a wall both for the burner casing and for the combustion chamber.

An important feature of this invention is the provision of a down draft burner which discharges its flame downwardly away from the grill and countercurrently to an upwardly flowing current of air to be heated. As will appear from Figure 1 of the drawing, this feature is obtained in a preferred form of the invention by providing a discharge opening in the bottom wall 19 of the vaporization chamber and, desirably, by also positioning combustion chamber 14 directly below the burner. To receive gases discharged from the vaporization chamber, the top wall 24 of the combustion chamber is provided with an inlet opening 26 in the registry with said discharge outlet. Means for introducing secondary air into the gas stream discharged from the vaporization chamber is here provided in the form of spaced burner rings 27 and 28 which define a burner throat at the bottom of the vaporization chamber and at the top of the combustion chamber.

In high fire operation, oil flows through inlet pipe 16 into vaporization chamber 18 where it is ignited by any suitable means, preferably an electrically heated coil 29 suspended from top 22 of the container. Oil in the bottom 19 of the container is vaporized by heat received from the fire and is mixed with air introduced through air inlets in side wall 21 of the container. A burnable mixture flows downwardly out of the discharge opening in the bottom 19 thereof, through inlet 26 in the top of the combustion chamber. It is important to note that the flame is directed both away from the grill and countercurrently to the air rising through the hot air conduit surrounding the combustion chamber. This important feature yields improved heat exchange efficiency between the flame or combustion gases and the air to be heated. It also causes the hotter portions of the combustion chamber to be spaced a safer distance from the grill and floor level and to be positioned adjacent the lower end of the furnace casing. This in turn maintains the upper end of the furnace casing at a relatively low temperature as compared with the lower end or bottom of said casing. Thus cold air entering the furnace at its upper end flows downwardly along casing 12 in the direction of an upward temperature gradient. In such conventional furnaces the entering air serves to carry heat back from the top hotter portion of the casing to the cooler lower end thereof. This results in higher heat loss and reduced efficiency of heat transfer between the casing and the air, as compared with the construction and arrangement here shown.

The furnace may be operated under an induced draft from a stack (not shown) or a forced draft may be utilized such as shown in the form of apparatus illustrated in the drawing, wherein a blower 35 discharges air under positive pressure into burner casing 13a which, in one sense, comprises a manifold for distributing air to the burner air inlet means in the vaporization chamber wall 21.

An important feature of the invention also is the provision of means for removing combustion gases from the bottom end rather than the top end of the combustion chamber. A significant advantage of this construction is the tendency of the hotter combustion gases to remain in the combustion chamber longer and give up more heat to the air flowing around the chamber while the relatively cooler combustion gases gravitate to the bottom of the combustion chamber and are withdrawn through flue pipe 31 at the bottom end thereof. Heat exchange efficiency is thus enhanced. Further, the flame or hot combustion gases are at no time brought near the grill or floor which affords increased safety of operation.

Combustion chamber 14 is supported in spaced relation to the bottom of the furnace casing by crossed frame members 32 and 33 which also comprise vanes to conduct heat from the bottom of the combustion chamber to the air circulated therearound. Previously mentioned concentrically arranged cylindrical partitions 15a and 15b are supported by upright plates 34 suitably secured to said frame members 32 and 33. A relatively narrow annular duct is provided between said partitions to cause the flow of restricted quantities of air therethrough and to increase the temperature differential between the downwardly flowing colder air in the outer passage and the upwardly flowing hot air of the inner conduit. The greater temperature differential increases the air flow rate through the furnace.

It should be observed that in the preferred embodiment of the invention here illustrated another significant advantage is obtained by placing the burner 13 in the hot air stream and immediately below the grill. Burner casing 13a is thus brought in heat exchange relation with the hot air stream being discharged upwardly around the same. Primary and secondary air supplied to the burner preferably by blower 35, is circulated through the burner casing and thereby preheated to enhance oil vaporization and enlarge the capacity and efficiency of the burner. Secondary air is further preheated by passing the same over the top member 24 of the combustion chamber whereby it simultaneously reduces heat transfer to bottom 19 of vaporization chamber and controls the temperature of liquid fuel thereon to prevent undue cracking and deleterious formation of free carbon or resinous gums in the chamber.

Burner 13 also possesses other unique features which adapt it to and cooperate with the provision of a down draft flame in a floor furnace. Among these features is the provision of means to insure adequate mixing of primary air and oil vapors in the generator chamber 18, here shown in the form of burner tube 36 extending upwardly from bottom 19 of said chamber to adjacent top 22 thereof. This burner tube in one sense comprises an extension of the burner throat and cooperates with burner casing 13a to force the oil vapors to travel upwardly through at least a major portion of the vaporization chamber to be thoroughly mixed with preheated primary air before discharge into the burner throat.

In low fire operation the mixture of air and oil vapor is in proper combustion proportions when it reaches the top of burner tube 36 and the fire burns in a downwardly projected flame in the upper portion of said tube. In this stage of operation the top wall 22 and the upper edge of burner tube 36 define a low fire burner throat. Means for admitting secondary air to the low fire is here provided in the form of air inlets 37 above and in alignment with the inlet end of the burner tube. It should be noted that this arrangement is of particular advantage since it assures adequate oil vaporization even at low fire by placing the liquid fuel and fire in close heat coupling. Further, by discharging the low fire downwardly and removing combustion products from the bottom end of combustion chamber 14 heating efficiency of the furnace is enhanced by retaining the hotter combustion gases in the combustion chamber a relatively long time and removing only the cooler gases which gravitate to the bottom thereof.

Reference has been made to the ready accessibility of burner parts and controls from the grill, whereby operation of the controls and cleaning or repair of the burner are facilitated. As will be seen from the drawing, the electrically operated lighter 29 together with automatic switch 38 are mounted on top 22 of the vaporization chamber where they are readily accessible. Likewise, means for manually lighting the burner is conveniently provided by tube 39 having a removable closure 41 through which the burner is easily reached for starting the fire.

Suitable means for supplying electricity to the blower and electric igniter is here provided by junction box 42 electrically connected to blower 35 and to transformer 43 which provides current through switch 38 to igniter coil 29 when the oil supply control is in "on" position. The electrical elements are preferably positioned in the upper relatively cool portions of the furnace casing to avoid deleterious effects of high temperature thereon.

As here illustrated, easy access to interior burner parts is provided by opening 45 in top 22 of the vaporization chamber; cap 44 is readily detached and burner tube 36 may be withdrawn to permit inspection, cleaning, or repair of all burner parts.

The furnace of Figures 1 and 2 may be provided with means for directing air under the bottom of the combustion chamber to reduce the temperature thereof and thereby increase heat transfer from the combustion gases to air flowing through the furnace. Such a modified form of the invention is illustrated in Figure 3 wherein a preferably cylindrical combustion chamber 51 having a combustion gas outlet 52 at its lower end is positioned centrally in the bottom of a furnace casing 53. Coaxially arranged cylindrical partitions 54 and 56 define, with furnace casing 53, an outer cold air passage and, with combustion chamber 51 form an inner hot air conduit.

Means for directing air under the bottom of combustion chamber 51, as here provided, comprises an annular baffle plate 59 supported on radial vanes 62 and extending inwardly from the lower end of cylindrical partition 54 to define an opening centrally thereof and below the combustion chamber. Air to be heated thus flows through the furnace first downwardly in the cold air passage, then is directed inwardly along the bottom of furnace casing 53, thence upwardly through opening 61 in baffle plate 59, and finally outwardly along the bottom of combustion chamber 51 to the hot air conduit—all as indicated by arrows 57 and 58 of Figure 3. Heat transfer from the combustion gases to the air is thereby increased and the bottom of both the combustion chamber and the furnace casing desirably are maintained at relatively low temperature. Radially disposed heat distributing vanes 63 and 64 serve to support the combustion chamber above and in spaced relation to baffle plate 59.

From the foregoing it will be apparent that my invention provides a floor furnace having high heating efficiency, low grill temperature, and ready accessibility of burner parts from floor level.

I claim:

1. A floor furnace comprising a casing open at its upper end and arranged to extend below the level of a floor, a grill in said open end, a vertically disposed tube in said casing, said tube being closed at its upper end by a top wall just below and spaced from said grill, a burner including a burner chamber housing provided with a top wall below and spaced from said tube top wall within said tube and having an air inlet and a downwardly directed discharge opening downwardly directing a flame into said tube below the burner housing, means to admit fuel to said burner, means to ignite said fuel in said burner, and means to circulate air between the tube top wall and said burner top wall.

2. In a floor furnace, an outer housing having a closed bottom and an open top, the housing being adapted to be supported with its open top in general alignment with the floor of a room to be heated, a grill closing such open top, a heater in the housing including a combustion chamber, a burner pot located immediately above the combustion chamber between it and the grill, the pot having a top wall and being open at the bottom and in direct communication with the interior of the combustion chamber through the top of the latter, and said heater having an air housing enclosing and spaced from the top of the pot, means for supplying air under pressure to the latter housing to cool the walls of the pot and to support combustion in said pot, means for supplying liquid fuel to the pot for vaporization and combustion, means within the outer housing for guiding a flow of cold air downwardly through a portion thereof to a point below the heater, and for guiding heated air upwardly through another portion of the housing along the walls of the heater for discharge through the open top of the housing, the air supplying means being located in the path of the downwardly flowing column of air.

3. A floor furnace comprising a casing open at its upper end and arranged to extend below the level of a floor, a grill in said open end, a vertically disposed heater in said casing, said heater being closed at its upper end by a top wall just below and spaced from said grill, a burner including a burner chamber housing within said heater and provided with a top wall below and spaced from said top heater wall, said burner having an air inlet and a downwardly directed discharge opening to project a flame downwardly through said heater, means to admit fuel to said burner, means at least partially surrounding said heater and defining with the heater an air circulating space communicating with the space between the grill and the heater top wall, and means to circulate air between the heater top wall and said burner top wall.

4. A floor furnace comprising a casing open at its upper end, and arranged to extend below the level of a floor, a grill in said open end, a vertically disposed tube in said casing, said tube being closed at its upper and lower ends by top and bottom walls respectively, said top wall being spaced from said grill, a transaxial partition in said tube intermediate the ends of the latter and defining therein upper and lower chambers, said partition having an opening therein providing communication between the upper and lower chambers, a burner including a combustion chamber housing within said upper chamber, said housing provided with a top wall below and spaced from said top tube wall to provide for circulation of air between the top of the burner and the top tube wall, said burner having an air inlet and a discharge throat aligned with and through which to project a flame downwardly through said partition opening into said lower chamber, said throat being spaced from the partition opening to provide an annular passage bordering the partition opening and in communication with the latter and with said upper chamber, means to admit fuel to said combustion chamber, means to ignite said fuel in said combustion chamber, means to establish an elevated air pressure in said above air space and in said upper chamber surrounding said combustion chamber to establish a primary air flow into said combustion chamber through the air inlet thereof, to discharge from the combustion chamber through the throat thereof, and a secondary air flow from the upper chamber through said annular passage and through the partition opening into said lower chamber, and said tube having a duct associated therewith through which products of combustion may pass from said lower chamber.

5. A floor furnace comprising a casing open at its upper end, and arranged to extend below the level of a floor, a grill in said open end, a vertically disposed tube in said casing, said tube being closed at its upper and lower ends by top and bottom walls respectively, said top wall being just below and spaced from said grill, a transaxial partition in said tube intermediate the ends of the latter and defining therein upper and lower chambers, said partition having an opening therein providing communication between the upper and lower chambers, a burner including a combustion chamber housing having a top wall spaced from and below said top tube wall within said upper chamber, a throat mounted at the lower end of the combustion chamber, said burner having an air inlet and a discharge passage including a tubular member within said combustion chamber and extending from a point adjacent said air inlet at the upper end of the combustion chamber to said throat, means to circulate air between the tube top wall and said burner top wall, said throat having therein a discharge opening through which flame from the combustion chamber and flowing through said tubular member may pass through the partition opening and into said lower chamber, said throat being aligned with and spaced from said partition opening to define around the latter an annular passage providing communication between the upper chamber and the partition opening, means to admit fuel to said combustion chamber, means to ignite said fuel in said combustion chamber, means to establish an elevated air pressure in said above air space and in said upper chamber surrounding said combustion chamber to establish a primary air flow into said combustion chamber, through the air inlet thereof and through said tubular member to discharge from the throat into said lower chamber, and a secondary air flow from the upper chamber through said annular passage and partition opening and into said lower chamber, and means for conducting products of combustion from said lower chamber.

6. In combination, a floor furnace comprising a casing open at its upper end and arranged to extend below the level of a floor, a grill in said open end, a vertically disposed tube in said casing, a burner within said tube having a chamber with a top wall below and spaced from said grill, said burner having an air inlet and a bottom discharge opening downwardly directing a flame into said tube below said chamber, means to admit fuel to the burner, a transaxial wall between and spaced from said chamber top wall and said grill and being substantially immediately below the grill, and means to circulate air in the space between said transaxial wall and the burner chamber top wall.

7. A floor furnace comprising a casing open at its upper end and arranged to extend below the level of the floor, a grill in said open end, a burner having a housing within the casing with an upper wall adjacent and under said grill, air inlet means in said burner housing, said housing having a bottom discharge opening downwardly directing a flame therefrom, means to supply fuel within said burner housing, a tube in said casing having a chamber therein below said burner housing and receiving said flame from said discharge opening, a transaxial wall in said casing between and spaced from said grill and the upper wall of said burner housing, and means introducing air between said transaxial wall and said upper wall of the burner housing.

HARRY C. LITTLE.

REFERENCES CITED

The following references are of record in the file of this patent:

UNITED STATES PATENTS

| Number | Name | Date |
|---|---|---|
| 676,784 | Thompson | June 18, 1901 |
| 1,403,787 | Jacques | Jan. 17, 1922 |
| 1,527,233 | Stafford | Feb. 24, 1925 |
| 1,561,161 | Ionides | Nov. 10, 1925 |
| 1,755,727 | Cramer | Apr. 22, 1930 |
| 2,136,235 | Crago | Nov. 8, 1938 |
| 2,259,299 | Dewey | Oct. 14, 1941 |
| 2,302,235 | Martin | Nov. 17, 1942 |
| 2,401,330 | Breese | June 4, 1946 |
| 2,418,709 | Hayter | Apr. 8, 1947 |